United States Patent [19]
Hayashi et al.

[11] Patent Number: 5,089,101
[45] Date of Patent: Feb. 18, 1992

[54] CATIONIC ELECTRODEPOSITION COATING COMPOSITION

[75] Inventors: Hirokazu Hayashi, Hiratsuka; Tetsuo Aihara, Isehara; Haruo Nagaoka, Hiratsuka; Koji Kamikado, Yokohama; Eisaku Nakatani, Hiratsuka, all of Japan

[73] Assignee: Kansai Paint Co., Ltd., Hyogo, Japan

[21] Appl. No.: 701,632

[22] Filed: May 15, 1991

Related U.S. Application Data

[63] Continuation of Ser. No. 293,005, Jan. 3, 1989, abandoned.

[30] Foreign Application Priority Data

Jan. 8, 1988 [JP] Japan .................................. 63-1189

[51] Int. Cl.$^5$ ........................ C25D 13/00; C08L 63/00
[52] U.S. Cl. .................................. 204/181.7; 523/415; 523/417; 525/111; 525/113
[58] Field of Search ................... 204/181.7; 523/415, 523/417; 525/111, 113

[56] References Cited

U.S. PATENT DOCUMENTS

| | | | |
|---|---|---|---|
| 4,038,232 | 7/1977 | Bosso | 204/181.7 |
| 4,097,352 | 6/1978 | Bosso | 204/181.7 |
| 4,294,741 | 10/1981 | Bosso | 204/181.7 |
| 4,554,212 | 11/1985 | Diefenbach | 204/181.7 |
| 4,865,704 | 9/1989 | Saatweber | 204/181.7 |

Primary Examiner—John Niebling
Assistant Examiner—Steven P. Marquis
Attorney, Agent, or Firm—Wenderoth, Lind & Ponack

[57] ABSTRACT

A cationic electrodeposition coating composition comprising

[A] a neutralization product or a quaternary ammonium salt of a comb-shaped copolymer obtained by copolymerizing (a) 3 to 90 parts by weight of an ethylenically unsaturated monomer having a hydrocarbon chain with at least 8 carbon atoms at the molecular ends, (b) 1 to 50 parts by weight of at least one cationic (meth)acrylic monomer selected from the group consisting of aminoalkyl (meth)acrylates, aminoalkyl (meth)acrylamides (meth)acrylates containing a quaternary ammonium salt group and (meth)acrylamides containing a quaternary ammonium salt group, (c) 1 to 60 parts by weight of an alpha,beta-ethylenically unsaturated monomer other than the monomer (b), and (d) 0 to 95 parts by weight of an alpha,beta-ethylenically unsaturated monomer other than the monomers (a), (b) and (c),

[B] a cationic epoxy resin capable of being dissolved or dispersed in water, and

[C] a pigment.

20 Claims, No Drawings

CATIONIC ELECTRODEPOSITION COATING COMPOSITION

This application is a continuation of now abandoned application, Ser. No. 07/293,005 filed Jan. 3, 1989 now abandoned.

This invention relates to a cationic electrodeposition coating composition which shows excellent weatherability and is particularly useful as a primer paint for 2-coat finishing or an anticorrosive paint for use in a one-coat process.

In recent years, cationic electrodeposition paints of the blocked isocyanate-curable type comprising epoxy resins as base resins have been developed as a primer paint for automobile bodies, for example. They have superseded conventional anionic electrodeposition paints and gained widespread use because of their excellent corrosion resistance.

A conventional coating system for automobile bodies and the like using such a cationic electrodeposition paint generally involves a three-coat process comprising coating of a cationic electrodeposition primer paint, an intermediate coating paint and a top coating paint. Recently, a great deal of efforts have been made to decrease the number of coating steps and thus curtail the coating cost, and it has been strongly desired to develop a coating system which comprises a two-coat process consisting of the coating of a cationic electrodeposition primer paint and coating of a top coating paint and can impart film properties equivalent to those obtained by the conventional three-coat process. In such a two-coat process, the corrosion resistance of the coated film can be sufficiently given by the electrodeposition. But the weatherability of the coated film cannot be satisfactorily owing to the omission of the intermediate coating, and in the field of coating which requires high weather-resistant finishing of automobiles, etc., the two-coat process cannot be employed.

In order to solve the problem of insufficient weatherability in the two-coat process, various methods have been proposed as a result of extensive research work. For example, Japanese Laid-Open Patent Publication No. 236873/1987 discloses the incorporation of an ultraviolet absorber in a cationic electrodeposition paint. By this method, however, the adhesion between the electrodeposited film and the top coat film and the bath stability tend to be reduced. Moreover, although the method is effective for enhancing weatherability for a short period of time, this effect does not last for an extended period of time.

Japanese Laid-Open Patent Publication No. 174277/1987 discloses that a cationic epoxy resin is blended with a nonionic acrylic resin having a lower surface tension, and by the difference in surface tension between them, a double layer film of improved weatherability is formed in which the epoxy resin is localized in the lower layer and the nonionic acrylic resin, in the upper layer. According to this method, it is difficult to effect ideal localization of the two layers, and if the localization proceeds too much, the adhesion between the epoxy resin layer and the nonionic acrylic resin layer in the inside of the electrodeposited film becomes poor. Conversely, if the localization is insufficient, no double layer film is formed, and the resulting film has insufficient corrosion resistance and weatherability.

The present inventors noted that in the preparation of conventional cationic electrodeposition paints, it is the general practice to use a neutralization product of an epoxy-amine adduct or an epoxy resin of the quaternary ammonium salt type as a pigment dispersing agent and a low-molecular-weight compound such as a surface-active agent as a dispersing aid, as in Japanese Patent Publications Nos. 47143/1978, 23313/1980 and 2089/1981 (corresponding to U.S. Pat. Nos. 3935087, 4038232 and 4097352), and extensively studied the cationic electrodeposition paints from the standpoint of pigment dispersing agents.

It has consequently been found that by using a neutralization product or a quaternary ammonium salt of a comb-shaped copolymer as a pigment dispersing resin and combining the resulting pigment paste with a water-solubilizing or water-dispersible cationic epoxy resin, a cationic electrodeposition paint can be obtained which shows satisfactory weatherability even when used as a primer paint for the 2-coat process or as an anticorrosive paint for the one-coat process and has good corrosion resistance coating operability and bath stability.

Thus, according to this invention, there is provided a cationic electrodeposition coating composition comprising

[A] a neutralization product or a quaternary ammonium salt of a comb-shaped copolymer obtained by copolymerizing (a) 3 to 90 parts by weight of an ethylenically unsaturated monomer having a hydrocarbon chain with at least 8 carbon atoms at the molecular ends, (b) 1 to 50 parts by weight of at least one cationic (meth)acrylic monomer selected from the group consisting of aminoalkyl (meth)acrylates, aminoalkyl (meth)acrylamides, (meth)acrylates containing a quaternary ammonium salt group and (meth)acrylamides containing a quaternary ammomium salt group, (c) 1 to 60 parts by weight of an alpha,beta-ethylenically unsaturated nitrogen-containing monomer other than the monomer (b), and (d) 0 to 95 parts by weight of an alpha,beta-ethylenically unsaturated monomer other than the monomers (a), (b) and (c),

[B] a cationic epoxy resin capable of being dissolved or dispersed in water, and

[C] a pigment.

The neutralization product or quaternary ammonium salt of a comb-shaped copolymer used in the coating composition of this invention (resin [A]) is a copolymer of the structure in which relatively oleophilic long side-chains are bonded indirectly to the main chain containing a hydrophilic nitrogen-containing (meth)acrylic monomer. Because of this unique structure, the copolymer has the very high ability to disperse pigments, and since the main skeleton is a saturated carbon-carbon bond chain, the copolymer has excellent weatherability. Furthermore, because the copolymer has a very good ability to adsorb the pigment owing to its nitrogen-containing monomer units, it has excellent stability in an electrodeposition bath in a low solids concentration range. Morever, because of its basicity and comb-shaped structure, the copolymer has good compatibility with cationic epoxy resins used as base resins in ordinary cationic electrodeposition paints, and by combining it with the cationic epoxy resin, the mixture can give a dense coated film having excellent weather-ability and corrosion resistance.

The comb-shaped copolymer in the resin [A] having the above-mentioned properties can be produced by copolymerizing the monomers (a), (b) and (c) to be described below in detail.

(a) Ethylenically unsaturated monomer having a hydrocarbon chain with at least 8 carbon atoms at the molecular ends The monomer (a) used for the production of the resin [A] includes monomers containing a hydrocarbon chain having at least 8 carbon atoms at the molecular ends and an ethylenically unsaturated bond, for example, monomers obtained by modifying monomers containing an ethylenically unsaturated bond with modifiers containing a hydrocarbon chain with at least 8 carbon atoms such as oils, fats, fatty acids, aliphatic alcohols, fatty acid glycidyl esters and aliphatic amines.

Monomers having a functional group such as a hydroxyl, carboxyl, glycidyl, isocyanate or aziridinyl group in the molecule are preferred as the monomer containing an ethylenically unsaturated bond. Specific examples are hydroxyl-containing monomers such as hydroxyethyl (meth)acrylate and hydroxypropyl (meth)acrylate; carboxyl-containing unsaturated monomers such as (meth)acrylic acid, carboxyethyl (meth)acrylic acid, maleic acid, maleic anhydride, and itaconic acid; glycidyl-containing unsaturated monomers such as glycidyl (meth)acrylate, allyl glycidyl ether and vinylphenyl glycidyl ether; isocyanate-containing unsaturated monomers such as a 1:1 adduct of a diisocyanate compound (e.g., tolylene diisocyanate or isophorone diisocyanate) and a hydroxyalkyl (meth)acrylate, alpha,alpha-dimethyl-m-isopropenylbenzyl isocyanate and isocyanatoethyl (meth)acrylate; and aziridinyl-containing unsaturated monomers such as aziridinylethyl (meth)acrylate. Of these, hydroxyethyl (meth)acrylate, (meth)acrylic acid, glycidyl (meth)acrylate, the 1:1 adduct of a diisocyanate compound and a hydroxyalkyl (meth)acrylate, alpha,alpha-dimethyl-m-isopropenylbenzyl isocyanate, isocyanatoethyl (meth)acrylate and aziridinylethyl (meth)acrylate are preferred.

Specific examples of the modifier are oils and fats such as coconut oil, olive oil, castor oil, safflower oil, linseed oil, soybean oil, sesame oil, tall oil, cottonseed oil and dehydrated castor oil; fatty acids of these oils; fatty acids such as lauric acid, 2-ethylhexanoic acid, stearic acid and oleic acid; aliphatic alcohols such as 2-ethylhexyl alcohol, lauryl alcohol and stearyl alcohol; glycidyl esters of fatty acids such as Cardura E (a tradename for glycidyl esters of tertiary fatty acids having to 11 carbon atoms; produced by Shell Chemical Co.) and aliphatic amines such as octylamine, dodecylamine and stearylamine. Of these, lauric acid, stearic acid, oleic acid, coconut oil fatty acid, safflower oil fatty acid, lauryl alcohol, oleyl alcohol and stearyl alcohol ar preferred.

Examples of the ethylenically unsaturated monomer (a) having a hydrocarbon chain with at least 8 carbon atoms at the molecular ends are given below.

(i) Alkyl esters of (meth)acrylic acid such as 2-ethylhexyl (meth)acrylate, lauryl (meth)acrylate and stearyl (meth)acrylate.

(ii) Adducts between glycidyl-containing unsaturated monomer and fatty acids (see Japanese Laid-Open Patent Publication No. 227940/1984) such as an adduct of glycidyl (meth)acrylate with safflower oil fatty acid.

(iii) Reaction products between isocyanate-containing unsaturated monomers and aliphatic alcohols (see Japanese Laid-Open Patent Publication No. 235466/1986) such as a reaction product between a 1:1 (mole) adduct of tolylene diisocyanate/2-hydroxyethyl methacrylate and oleyl alcohol.

(iv) Esterification products between hydroxyl-containing unsaturated monomers and fatty acids (see Japanese Laid-Open Patent Publication No. 227940/1984) such as an esterification product between 2-hydroxyethyl methacrylate and linseed oil fatty acid.

(v) Adducts between aziridinyl-containing unsaturated monomers and fatty acids (see Japanese Laid-Open Patent Publication No. 103537/1986) such as an adduct between aziridinylethyl methacrylate and linseed oil fatty acid.

(b) Cationic (meth)acrylic monomer

The cationic acrylic monomer (b) used for the production of the resin [A] is at least one monomer selected from the group consisting of aminoalkyl (meth)acrylates, aminoalkyl (meth)acrylamides, (meth)acrylates containing a quaternary ammonium salt group and (meth)acrylamides containing a quaternary ammonium salt group.

Suitable aminoalkyl (meth)acrylates include aminoalkyl (meth)acrylates containing a substituted or unsubstituted amino group in the ester moiety, and those represented by the following formula (I) are especially suitable. The aminoalkyl (meth)acrylamides include aminoalkyl (meth)acrylamides containing a substituted or unsubstituted amino group in the amide moiety, and those represented by the following formula (II) are especially suitable.

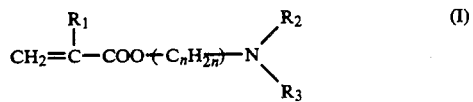

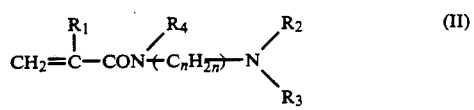

In these formulae, $R_1$ represents a hydrogen atom or a methyl group; $R_2$, $R_3$ and $R_4$, independently from each other, represent a hydrogen atom or a lower alkyl group; and n is an integer of 2 to 8.

The term "lower", as used in the present specification to qualify a group, means that the group so qualified has not more than 6, preferably not more than 4, carbon atoms.

Specific examples of the aminoalkyl (meth)acrylic monomers are N,N-dimethylaminoethyl methacrylate, N,N-diethylaminoethyl methacrylate, N,N-dimethylaminopropyl (meth)acrylate, N,N-dimethylaminobutyl (meth)acrylate, N-propylaminoethyl (meth)acrylate and N-butylaminoethyl (meth)acrylate which are the aminoalkyl (meth)acrylates of formula (I); and N,N-dimethylaminoethyl (meth)acrylamide and N,N-dimethyl-aminopropyl (meth)acrylamide which are the aminoalkyl(meth)acrylamide of formula (II). They may be used either singly or in combination. Of these, N,N-dimethylaminoethyl methacrylate, N,N-diethylaminoethyl methacrylate and N,N-dimethylaminopropyl (meth)acrylamide are especially preferred.

The (meth)acrylates and (meth)acrylamides containing a quaternary ammonium salt group used as the other cationic (meth)acrylic monomer include ester and amide monomers containing one quaternary ammonium salt group and one (meth)acryloyl group per molecule. Typically, compounds of the following formula (III)

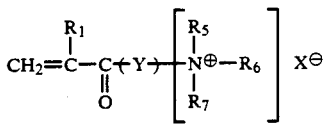

(III)

wherein $R_1$ is the same as defined above, Y represents the $-O-C_gH_{2g}-$group (where g is an integer of 2 to 8),

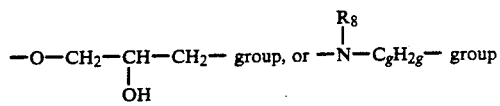

(where $R_8$ represents a hydrogen atom or a lower alkyl group, and g is as defined above), $R_5$, $R_6$ and $R_7$, independently from each other, represent a lower alkyl group, a hydroxy-lower alkyl group, a lower alkoxy-lower alkyl group, a cycloalkyl group, a substituted or unsubstituted phenyl group, or an aralkyl group, and $X^\ominus$ represents an anion, are suitable. In the above formula, the anion represented by $\ominus$ includes halogen ions and anion residues of acids. Specific examples include $Cl^\ominus$, $Br^\ominus$, $I^\ominus$, $F^\ominus$, $HSO_4^\ominus$, $SO_4^{2\ominus}$, $NO_3^\ominus$, $PO_4^{3\ominus}$, $HPO_4^{2\ominus}$, $H_2PO_4^\ominus$, $C_6H_5SO_3^\ominus$ and $OH^\ominus$.

Typical examples of the (meth)acrylic monomer containing a quaternary ammonium salt group include 2-hydroxy-3-(meth)acryloyloxypropyltrimethyl ammonium chloride, 2-hydroxy-3-(meth)acryloyloxypropyltributyl ammonium chloride, 2-hydroxy-3-(meth)acryloyloxypropyltriethanol ammonium chloride, 2-hydroxy-3-(meth)acryloyloxypropyldimethylbenzyl ammonium chloride, 2-hydroxy-3-(meth)acryloyloxypropyldimethylphenyl ammonium chloride, (meth)acryloyloxyethyltrimethyl ammonium chloride and (meth)acrylamidopropyltrimethyl ammonium chloride. These compounds may be used singly or in combination.

The above aminoalkyl (meth)acrylates, aminoalkyl (meth)acrylamides, (meth)acrylates containing a quaternary ammonium salt group and (meth)acrylamides containing a quaternary ammonium salt group used as the monomer (b) may be used as a mixture of two or more.

Especially preferred examples of the monomer (b) include N,N-dimethylaminoethyl methacrylate, N,N-diethylaminoethyl methacrylate and N,N-dimethylaminopropyl (meth)acrylamide.

(c) alpha,beta-Ethylenically unsaturated nitrogen-containing monomer other than the monomer (b)

The alpha,beta-ethylenically unsaturated nitrogen-containing monomer (c) other than the monomers (b) includes, for example, monomers containing one or more (usually up to 4) basic nitrogen atoms and one ethylenically unsaturated bond per molecule, typically unsaturated monomers having a nitrogen-containing heterocyclic ring and nitrogen-containing derivatives of (meth)acrylic acid having no nitrogen-containing heterocyclic ring. These monomers will be described below more specifically.

[1] The unsaturated monomers having a nitrogen-containing heterocyclic ring include monomers having a mono- or poly-nuclear heterocyclic ring containing 1 to 3, preferably 1 or 2, ring nitrogen atoms is bonded to the vinyl group. Specific examples are given below.

(i) Vinylpyrrolidones such as 1-vinyl-2-pyrrolidone and 1-vinyl-3-pyrrolidone.

(ii) Vinylpyridines such as 2-vinylpyridine, 4-vinylpyridine, 5-methyl-2-vinylpyridine and 5-ethyl-2-vinylpyridine.

(iii) Vinylimidazoles such as 1-vinylimidazole and 1-vinyl-2-methylimidazole.

(iv) Vinylcarbazoles such as N-vinylcarbazole.

(v) Vinylquinolines such as 2-vinylquinoline.

(vi) Vinylpiperidines such as 3-vinylpiperidine and N-1-methyl-3-vinylpiperidine.

(vii) Other compounds such as N-(meth)acryloylmorpholine represented by the following formula

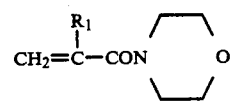

wherein $R_1$ is as defined above, and N-(meth)acryloyl pyrrolidine represented by the following formula

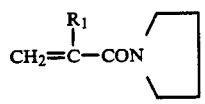

wherein $R_1$ is as defined above.

Of the above vinyl monomers having a nitrogen-containing heterocyclic ring, the vinylpyrrolidones in which the ring nitrogen atoms are converted to tertiary nitrogen atoms are especially preferred.

[2] The nitrogen-containing derivative of (meth)acrylic acid having no nitrogen-containing heterocyclic ring includes amides of (meth)acrylic acid, particularly suitable being (meth)acrylamides represented by the following formula (IV)

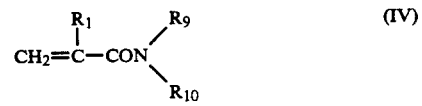

(IV)

wherein $R_9$ represents a hydrogen atom or a lower alkyl group, $R_{10}$ represents a hydrogen atom, a lower alkyl group, a hydroxy-lower alkyl group, or a lower alkoxy-lower alkyl group, and $R_1$ is as defined above.

Examples of the (meth)acrylamides of formula (IV) include (meth)acrylamide, N-methyl(meth)acrylamide, N-ethyl(meth)acrylamide, N-butyl(meth)acrylamide, N,N-dimethyl(meth)acrylamide, N,N-diethyl(meth)acrylamide, N,N-dipropyl(meth)acrylamide, N-methylol(meth)acrylamide, N-ethoxymethyl(meth)acrylamide and N-butoxymethyl(meth)acrylamide.

The alpha,beta-ethylenically unsaturated nitrogen-containing monomers may be used singly or in combination. Among these alpha,beta-ethylenically unsaturated nitrogen-containing monomers, 1-vinyl-2-pyrrolidone, (meth)acrylamide and N,N-dimethyl (meth)acrylamide are preferred, and 1-vinyl-2-pyrrolidone is especially preferred.

(d) Other alpha,beta-ethylenically unsaturated monomer

The alpha,beta-ethylenically unsaturated monomer (d) other than the monomers (a), (b) and (c) may be selected from a wide range depending upon the properties required of the comb-shaped copolymer in the resin [A] of the invention without any particular limitation. Typical examples are shown below.

(i) Esters of acrylic or methacrylic acid $C_{1-7}$ alkyl esters of acrylic or methacrylic acid, such as methyl acrylate, ethyl acrylate, propyl acrylate, isopropyl acrylate, butyl acrylate, hexyl acrylate, methyl methacrylate, ethyl methacrylate, propyl methacrylate, isopropyl methacrylate, butyl methacrylate and hexyl methacrylate; glycidyl acrylate and glycidyl methacrylate; $C_{2-7}$ alkoxyalkyl esters of acrylic or methacrylic acid such as methoxybutyl acrylate, methoxybutyl methacrylate, methoxyethyl acrylate, methoxyethyl methacrylate, ethoxybutyl acrylate and ethoxybutyl acrylate; $C_{2-7}$ alkenyl esters of acrylic or methacrylic acid such as allyl acrylate and allyl methacrylate; $C_{2-7}$ hydroxyalkyl esters of acrylic or methacrylic acid such as hydroxyethyl acrylate, hydroxyethyl methacrylate, hydroxypropyl acrylate and hydroxypropyl methacrylate; adducts of $C_{2-7}$ hydroxyalkyl esters of acrylic or methacrylic acid with $C_{4-7}$ lactones, such as an adduct between 1 mole of 2-hydroxyethyl methacrylate and 3 moles of epsilon-caprolactone; $C_{3-7}$ alkenyloxyalkyl esters of acrylic or methacrylic acid, such as allyloxyethyl acrylate and allyloxyethyl methacrylate; and $C_{3-7}$ carboxyalkyl esters of acrylic or methacrylic acid such as 2-carboxyethyl acrylate.

(ii) Vinyl aromatic compounds

Styrene, alpha-methylstyrene, vinyltoluene and p-chlorostyrene.

(iii) Polyene compounds

Butadiene, isoprene and chloroprene.

(iv) alpha,beta-ethylenically unsaturated carboxylic acids

Acrylic acid, methacrylic acid, maleic acid and itaconic acid.

(v) Other monomers

Acrylonitrile, methacrylonitrile, methyl isopropenyl ketone, vinyl acetate and vinyl propionate.

These unsaturated monomers may be properly selected according to the properties desired of the comb-shaped copolymer, and may be used singly or in combination.

The monomeric components (a) to (d) are copolymerized by known methods for the production of acrylic copolymers, for example by a solution polymerization method, an emulsion polymerization method or a suspension polymerization method.

The proportions of the four components in performing the copolymerization may be varied depending upon the properties desired of the final copolymer. The suitable proportions are 3 to 90 parts by weight, preferably 10 to 85 parts by weight and more preferably 15 to 65 parts by weight in view of pigment dispersibility and storage stability for the ethylenically unsaturated monomer (a) having a hydrocarbon chain with at least 8 carbon atoms at the molecular ends; 1 to 50 parts by weight, preferably 2 to 40 parts by weight and more preferably 4 to 35 parts by weight in view of water solubility and film properties for the cationic (meth)acrylic monomer (b); 1 to 60 parts by weight, preferably 2 to 50 parts by weight and more preferably 5 to 40 parts by weight in view of the appearance and properties of the resulting film for the alpha,beta-ethylenically unsaturated nitrogen-containing monomer (c) other than the monomer (b); and 0 to 95 parts by weight, preferably 5 to 86 parts by weight and more preferably 7 to 78 parts by weight in view of film properties for the alpha,beta-ethylenically unsaturated monomer (d) other than the monomers (a) to (c).

It is preferred from the viewpoint of weather-ability to use the acrylic monomer components in the monomer components (a) to (d) in an amount of at least 50% by weight.

Advantageously, the copolymerization reaction is carried out preferably by a solution-polymerization technique. This can be carried out by reacting the above four components (a) to (d) in a suitable inert solvent in the presence of a polymerization catalyst at a temperature of usually about 0° to 180° C., preferably about 40° to 170° C., for about 1 to 20 hours, preferably about 6 to 10 hours.

Desirably, the solvent used dissolves the resulting copolymer and is miscible with water.

The polymerization catalyst may be any of radical initiators that can be used in ordinary radical polymerization, such as azo compounds, peroxide compounds, sulfides, sulfines, sulfinic acids and nitroso compound, redox catalysts and ionization radiation.

There is no particular restrictions on the molecular weight of the comb-shaped copolymer obtained as above. If the molecular weight is too low, film properties particularly weatherability might be deteriorated. If the molecular weight is too high, the copolymer solution attains a high viscosity. If the viscosity is lowered, the concentration of the copolymer in the solution decreases and the dispersibility of the pigment is likely to be reduced. Accordingly, it is advantageous to perform the copolymerization so that the number average molecular weight of the resulting copolymer generally becomes about 700 to 150,000, preferably about 1,000 to 100,000, especially preferably about 1,500 to 80,000.

The resulting copolymer may generally have an amino group equivalent of at least 0.02 milliequivalent/g of copolymer, preferably 0.2 to 1.5 milliequivalent/g of copolymer, more preferably 0.3 to 1.2 milliequivalents/g of copolymer.

The resulting copolymer resin is water-solubilized either directly or after the solvent is evaporated from it. Water-solubilization may be carried out in a customary manner by, for example, neutralizing the amino groups in the copolymer resin with a known neutralizing agent, or converting it to a quaternary ammonium group. Examples of the neutralizing agents include organic acids such as formic acid, acetic acid, propionic acid, butyric acid, hydroxyacetic acid and lactic acid and inorganic acids such as boric acid, hydrochloric acid, phosphoric acid and sulfuric acid. Formic acid and acetic acid are preferred.

The neutralization treatment can be easily carried out in a customary manner by adding the neutralizing agent or its aqueous solution to the copolymer resin obtained as above or its solution. The amount of the neutralizing agent used is generally 0.1 to 2.0 equivalents, preferably 0.3 to 1.0 equivalent, based on the amino groups in the resin.

Conversion of the amino groups in the copolymer into quaternary ammonium salt groups may be carried out by reacting the copolymer with a 1,2-epoxy compound described below in the presence of an acid and as required, water to convert the secondary or tertiary amino groups in the copolymer into quaternary ammonium salt groups.

The 1,2-epoxy compound that can be used in converting the copolymer into a quaternary ammonium salt may be, for example, a compound represented by the following formula (V)

wherein $R_1$ is as defined above $R_{11}$ represents a hydrogen atom, an alkyl group, a cycloalkyl group, $-CH_2-O-R_{12}$,

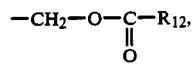

or a substituted or unsubstituted phenyl group, and $R_{12}$ represents a hydrogen atom, an alkyl group, a cycloalkyl group, an alkenyl group or a substituted or unsubstituted phenyl group.

The alkyl group and the cycloalkyl group which may be represented b $R_{11}$ or $R_{12}$ generally have 1 to 18 carbon atoms, preferably 1 to 8 carbon atoms. The alkenyl group may preferably have 2 to 6 carbon atoms. A lower alkyl group or a lower alkoxy group, for example, may be used as a substituent on the phenyl group.

Typical examples of the 1,2-epoxy compound include ethylene oxide, propylene oxide, 1,2-butylene oxide, 1,2-pentylene oxide, 1,2-octylene oxide, styrene oxide, glycidol, glycidyl (meth)acrylate, glycidyl acetate, glycicdyl laurate, Cardura E (glycidyl esters of tertiary fatty acids having to 11 carbon atoms, a product of Shell Chemical Co.), butyl glycidyl ether, octyl glycidyl ether, phenyl glycidyl ether, p-tert-butyl phenyl glycidyl ether and allyl glycidyl ether.

The amount of the 1,2-epoxy compound may be varied depending upon the type of the amino groups to be converted to quaternary ammonium salt groups. Generally, it is convenient to use the 1,2-epoxy compound in an amount of 2 to 4 moles per mole of a secondary amino group, and 1 to 2 moles per mole of a tertiary amino group.

The acid used in the quaternization reaction may be, for example, an organic acid such as formic acid, acetic acid, lactic acid, (meth)acrylic acid, propionic acid, butyric acid or hydroxyacetic acid or an inorganic acid such as boric acid, hydrochloric acid, phosphoric acid or sulfuric acid. The acid is conveniently used in an amount of about 1 to 2 moles per mole of the amino group to be converted to a quaternary ammonium salt group.

The suitable amount of water used is about 0.5 to 20 moles per amino group to be converted to a quaternary ammonium salt group.

One preferred method of converting the amino group of the copolymer derived from the cationic (meth)acrylic monomer (b) is to add the 1,2-epoxy compound and water to a mixture of the copolymer and the acid, and reacting the materials at room temperature to about 120° C. for about 1 to 7 hours. If the amino group to be converted to a quaternary ammonium salt group is a secondary amino group, it is possible to react the secondary amino group with the 1,2-epoxy compound to convert it into a tertiary amino group, and then convert the tertiary amino group into a quaternary ammonium salt group.

The copolymer converted into a quaternary ammonium compound should contain the quaternary ammonium salt groups in an amount sufficient to water-solubilize the copolymer. This amount may vary depending upon the type and the molecular weight of the copolymer. Generally, it is 0.01 to 6 milliequivalents/g of copolymer, preferably 0.1 to 3 milliequivalents/g of copolymer, and more preferably 0.3 to 1.2 milliequivalents/g of copolymer.

By subjecting the comb-shaped copolymer to the neutralization treatment or conversion to a quaternary ammonium compound as above, the resin [A] used in the invention which is a neutralization product or quaternary ammonium salt of the comb-shaped copolymer can be obtained.

The cationic epoxy resin B) which can be dissolved or dispersed in water in this invention may be, for example, cationic epoxy resins usually employed in cationic electrodeposition paints.

It may, for example, be a polyamine resin typified by an amine-epoxy resin adduct. Examples include (i) addition-reaction products between polyepoxide compounds and primary mono- and polyamines, secondary mono- and polyamines or primary-secondary mixed polyamines (see, for example, U.S. Pat. No. 3,984,299), (ii) addition-reaction products between polyepoxide compounds and secondary mono- and polyamines having a ketiminized primary amino group (see, for example, U.S. Pat. No. 4,017,438), and (iii) reaction products obtained by etherification between polyepoxide compounds and hydroxy compounds having a ketiminized primary amino group (see, for example, Japanese Laid-Open Patent Publication No. 43013/1984).

The polyepoxide compound used for the production of the above polyamine resins is a compound having at least two epoxy groups

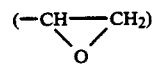

per molecule. Suitable polyepoxide compounds have a number average molecular weight of generally at least 200, preferably 400 to 4,000, more preferably 800 to 2,000, and are preferably obtained by the reaction of polyphenol compounds with epichlorohydrin. Examples of the polyphenol compounds used to form the polyepoxide compounds include bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butyl-phenyl)2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4'-dihydroxydiphenylsulfone, phenol novolak and cresol novolak.

The polyepoxide compounds may be partially reacted with polyols, polyether polyols, polyester polyols, polyamideamines, polycarboxylic acids, polyisocyanate compounds, etc. Alternatively, epsiloncaprolactone or an acrylic monomer, for example, may be graft-polymerized.

In view of corrosion resistance, weatherability and adaptability to coating of a thick film, the following polyepoxides which have good compatibility with the comb-shaped copolymer for pigment dispersion are particularly preferred among the above polyepoxide compounds.

(1) Polyepoxides obtained by reacting an adduct of 1 mole of bisphenol A and 1 to 6 moles of a 1,2-alkylene oxide having 3 to 4 carbon atoms with 2 moles of an epihalohydrin, and reacting the resulting diepoxide compound with a bisphenol and, as required, bisphenol diglycidyl ether.

(2) Polyepoxides obtained by reacting an adduct of 1 to 2 moles of a glycidyl ether of a monoalcohol or a phenolic compound having 1 to 10 carbon atoms and 1 mole of bisphenol A with 2 moles of an epihalohydrin, and reacting the resulting diepoxide compound with a bisphenol and as required, bisphenol diglycidyl ether.

(3) Polyepoxides obtained by addition-reacting a lactone having 5 to 8 carbon atoms such as epsiloncaprolactone with a hydroxyl-containing epoxy resin having an epoxy equivalent of 200 to 400, and further subjecting the resulting product having a ring-opened lactone in the side chain to addition-reaction with a polyphenol compound such as bisphenol A.

In the polyepoxide compounds (1) and (2), a plasticizing component such as an alkyleneoxy group, an alkoxymethylethyleneoxy structure or a phenoxymethylethyleneoxy structure is introduced into the main chain of the polyepoxide. In the polyepoxide compound (3), a ring-opened lactone is bonded as a plasticizing component to the side chain of the polyepoxide.

Compounds given in (1) to (4) below may be cited as examples of the primary mono- and polyamines, secondary mono- and polyamines and primary-secondary mixed polyamines.

(1) Aldimines, ketimines, oxazolines or imidazolines obtained by reacting amine compounds having one secondary amino group and at least one primary amino group, such as diethylenetriamine, hydroxyethylaminoethylamine, ethylaminoethylamine and methylaminopropylamine, with ketones, aldehydes or carboxylic acids at a temperature of about 100° to 230° C. to modify the primary amino group.

(2) Secondary monoamines such as diethylamine, diethanolamine, di-n- or -iso-propanolamine, N-methylethanolamine and N-ethylethanolamine.

(3) Michael addition reaction products having a secondary amino group obtained by addition-reaction between monoalkanolamine such as monoethanolamine and dialkyl (meth)acrylamides.

(4) Compounds obtained by ketiminizing the primary amino group of alkanolamines such as monoethanolamine, neopentanolamine, 2-aminopropanol, and 2-hydroxy-2'-(aminopropoxy) ethyl ether.

The polyamine resin typified by the above amine-epoxy resin adduct may, as required, be cured by using a curing agent such as a polyisocyanate compound blocked with an alcohol.

It is possible to bond a partly blocked polyisocyanate to the polyamine resin, and use the partly blocked isocyanate for curing the polyamine resin.

An amine-epoxy resin adduct which can be cured without using a blocked isocyanate compound may also be used. This resin may be, for example, a resin obtained by introducing a beta-hydroxyalkyl carbamate group into a polyepoxide compound (see, for example, Japanese Laid-Open Patent Publication No. 155470/1984), or a resin of the type curable by transesterification (see, for example, Japanese Laid-Open Patent Publication No. 80436/1980).

In the present invention, an amino-containing acrylic resin or a nonionic acrylic resin ma be used in combination with the above amine-epoxy resin adduct in order to improve weatherability.

The cationic epoxy resin typified by the amine-epoxy resin adducts described above may be water-solubilized or water-dispersed usually by neutralizing the resin with a water-soluble organic acid such as formic acid, acetic acid or lactic acid and adding water.

The coating composition of this invention comprises the pigment [C] as an essential component in addition to the resin [A] and the cationic epoxy resin [B]. The pigment may be any of those which are usually employed in cationic electrodeposition paints. Examples include colored pigments such as titanium white, carbon black and graphite, extender pigments such as clay and talc, anticorrosive pigment such as zinc chromate, strontium chromate, lead sulfate and lead silicate.

Preferably, the pigment is dispersed together with the resin [A] used in the invention and as required, water and a hydrophilic solvent in a dispersing device. The dispersing device may be those dispersing machines which are normally used in the paint industry. Examples are a ball mill, a roll mill, a homomixer, a sand grinder mill, a paint shaker and an attriter.

At the time of dispersing the pigment, the resin [A] may be used generally in an amount of about 1 to 1000 parts by weight, preferably about 1 to 300 parts by weight, per 100 parts by weight of the pigment. If the amount of the resin [A] exceeds the upper limit of this range, the tinting strength and the viscosity of the resulting pigment paste tends to be out of equilibrium. On the other hand, if the amount is below the lower limit, the dispersion stability of the pigment is liable to decrease.

The dispersion stability may be enhanced, as required, by adding known surface-activated agents or protective colloids at the time of dispersing the pigment.

In the resulting pigment dispersed paste, the pigment is dispersed very uniformly and finely, and even on storage for a long period of time, the pigment particles hardly flocculate or sediment.

The cationic electrodeposition coating composition of this invention can be obtained by uniformly mixing the resulting pigment paste with the cationic epoxy resin B) (usually as an aqueous solution or dispersion) and if required, the resin [A].

In the coating composition of this invention, the preferred proportions of the resin [A] and the cationic epoxy resin [B] are such that the amount of the resin [A] as solids is in the range of 0.01 to 50 parts by weight, especially 1 to 20 parts by weight, per 100 parts by weight of the resins [A] and [B] (as solid) combined. The proportions within the above range are preferred from the standpoint of corrosion resistance, weatherability, and throwing power at the time of electrodeposition coating. The weatherability tends to increase with increasing amount of the resin [A] added. It is convenient to determine the amount of the resin [A] within a range in which the corrosion resistance of the resulting coated film and the function of the cationic electrodeposition coating composition, for example its throwing power are not degraded.

Known methods and machines heretofore used for cationic electrodeposition coating may be used in coating the cationic electrodeposition coating composition of this invention on a substrate. Desirably, the substrate is used as a cathode and a stainless steel or carbon plate, as an anode. There is no particular limit on the electrodeposition coating conditions that can be used in this invention. Generally, it is desirable to carry out the electrodeposition in an agitated bath at a bath temperature of 20° to 30° C., a voltage of 100 to 400 V (preferably 200 to 300 V) and a current density of 0.01 to 3 A/dm$^2$ for a current passing time of 1 to 5 minutes. The distance between the electrodes is maintained at 10 to 100 cm, and the anode/cathode area ratio, at from 2:1 to 1:2.

The deposited film on an article as a cathode is washed, and may be cured by heating at about 140° C. to 180° C.

In the cationic electrodeposition coating composition, the resin [A] has excellent pigment adsorbing ability ascribable to its nitrogen-containing monomer units in the main chain, and firmly adsorbs the pigment. Furthermore, since it has an oleophilic long-chain hydrocarbon group in the side chain portion in a form separated from the main chain, the stability of the pigment dispersed in the resin is excellent. The resin [A] also shows excellent stability in a low solids concentration range in an electrodeposition bath containing the cationic epoxy resin [B] and the pigment. The resin [A] also has good compatibility with the cationic epoxy resin [B]. By combining the resin [A] with the cationic epoxy resin [B], particularly the amine/epoxy resin adduct resulting from introduction of a plasticizing component into the main chain or side chain of a polyepoxide, a dense coated film can be obtained, and the resulting coated film has excellent weatherability in addition to excellent corrosion resistance and appearance since the main skeleton of the resin [A] is an acrylic polymer.

Accordingly, the coating composition of this invention can be used without any practical problem as an undercoat paint for forming a coated film having fully satisfactory properties by the 2-coat process and also as an anticorrosive paint for the one-coat process.

The following examples illustrate the present invention more specifically. All parts and percentages in these examples are by weight.

Production of the monomer (a) in the resin [A]
(Referential Examples)

REFERENTIAL EXAMPLE (a-1)

Safflower oil fatty acid (236 parts), 119 parts of glycidyl methacrylate, 0.4 part of hydroquinone and 0.2 part of tetraethyl ammonium bromide were put in a reactor, and reacted at a temperature of 140° to 150° C. to give a modified acrylic monomer (a-1). The addition reaction between the epoxy groups and the carboxyl groups was monitored while the amount of the remaining carboxyl groups was measured. A period of about 4 hours was consumed until the reaction was completed.

REFERENTIAL EXAMPLE (a-2)

Linseed oil fatty acid (364 parts), 208 parts of aziridinylethyl methacrylate and 0.6 part of hydroquinone were put in a reactor, and while the reaction solution was stirred, addition reaction was carried out at a reaction temperature of 140° to 150° C. The addition reaction between the epoxy groups and the carboxyl groups was monitored while the amount of the remaining carboxyl groups was measured. After a reaction time of about 4 hours, a modified acrylic monomer (a-2) was obtained.

REFERENTIAL EXAMPLE (a-3)

A reactor was charged with 278 parts of 2-hydroxyethylmethacrylate, 208 parts of tolylene diisocyanate and 0.1 part of hydroquinone, and they were reacted at 60° C. for 3 hours to give an unsaturated monomer having isocyanate groups. Oleyl alcohol (430 parts) was added to 486 parts of the resulting NCO-containing unsaturated monomer, and the mixture was reacted at 80° C. for 3 hours to give an unsaturated monomer (a-3) having a urethane linkage.

[I] Production of aqueous solutions of comb-shaped copolymers

PRODUCTION EXAMPLE 1

In a reactor, 320 parts of ethylene glycol monobutyl ether was put and heated to 120° C. A mixture composed of 113 parts of the modified acrylic monomer (a-1), 126 parts of 1-vinyl-2-pyrrolidone and 11 parts of N,N-dimethylaminoethyl methacrylate and a mixture composed of 17 parts of azobisdimethylvalelonitrile and 50 parts of ethylene glycol monobutyl ether were individually added dropwise to the hot ethylene glycol monobutyl ether over the course of about 2 hours. The reaction was carried out while nitrogen was introduced into the reactor and the solution was stirred.

One hour after the end of adding the two mixtures, 2.5 parts of azobisisobutyronitrile was added to the reactor, and after another 2 hours, 2.5 parts of azobisisobutyronitrile was further added to the reaction solution. Then, the reaction was carried out for 2 hours while the reaction solution was maintained at 120° C. After the end of the reaction, the unreacted monomers and ethylene glycol monobutyl ether were evaporated under reduced pressure to give a copolymer solution having a drying residue of 70.5% and a Gardner viscosity (measured as a solution of 40% solids in ethylene glycol monobutyl ether) of E. The copolymer was neutralized with lactic acid to 1.0 equivalent and water was added to give an aqueous solution of a comb-shaped copolymer [A-1] having a solids content of 40%.

PRODUCTION EXAMPLE 2

A solution of a copolymer having a drying residue of 70.4% and a Gardner viscosity (measured as a solution of 40% solids in ethylene glycol monobutyl ether) of H was prepared by operating in the same way as in Production Example 1 except that the following two mixtures were used instead of the two mixtures used in Production Example 1. The copolymer was neutralized with lactic acid to 1.0 equivalent, and water was added to give an aqueous solution of a comb-shaped copolymer [A-2] having a solids content of 40%.

A mixture composed of 113 parts of the modified acrylic monomer (a-2), 65 parts of 1-vinyl-2-pyrrolidone, 50 parts of N,N-dimethylacrylamide and 22 parts of N,N-dimethylaminopropylacrylamide, and a mixture composed of 17 parts of azobisdimethylvaleronitrile and 50 parts of ethylene glycol monobutyl ether.

PRODUCTION EXAMPLE 3

A solution of a copolymer having a drying residue of 70.0% and a Gardner viscosity (measured as a solution of 40% solids in ethylene glycol monobutyl ether) of G was prepared by operating in the same way as in Production Example 1 except that the following two mixtures were used instead of the two mixtures used in Production Example 1. The copolymer was neutralized with lactic acid to 1.0 equivalent, and water was added to give an aqueous solution of a comb-shaped copolymer [A-3] having a solids content of 40%.

A mixture composed of 80 parts of the unsaturated monomer (a-3) containing a urethane linkage, 33 parts of 2-ethylhexyl acrylate, 100 parts of 1-vinyl-2-pyrrolidone, 15 parts of n-butyl methacrylate and 22 parts of N,N-dimethylaminopropylacrylamide, and a mixture composed of azobisdimethylvaleronitrile and 50 parts of ethylene glycol monobutyl ether.

PRODUCTION EXAMPLE 4

A solution of a copolymer having a drying residue of 70.3% and a Gardner viscosity (measured as a solution of 40% solids in ethylene glycol monobutyl ether) of M was prepared by operating in the same way as in Production Example 1 except that a mixture composed of 99 parts of the modified acrylic monomer (a-1), 46 parts of stearyl methacrylate, 93 parts of 1-vinyl-2-pyrrolidone and 12 parts of N,N-dimethylaminopropylacrylamide, and a mixture composed of 18 parts of azobisdimethylvaleronitrile and 60 parts of ethylene glycol monobutyl ether were used instead of the two mixtures used in Production Example 1.

To the resulting copolymer were added 6.9 parts of lactic acid, 5.5 parts of 1,2-butylene oxide and 6.9 parts of water, and they were reacted at 90° C. for 6 hours to convert it into a quaternary ammonium salt. Water was further added to give an aqueous solution of a comb-shaped copolymer [A-4] having a solids content of 40%.

PRODUCTION EXAMPLE 5

One hundred parts of ethylene glycol monobutyl ether was put in a reactor and heated to 120° C. Then, a mixture composed of 150 parts of the modified acrylic monomer (a-1), 50 parts of 1-vinyl-2-pyrrolidone, 25 parts of 2-hydroxyethyl methacrylate and 25 parts of N,N-dimethylaminoethyl methacrylate, and a mixture composed of 6 parts of azobisdimethylvaleronitrile and 44 parts of ethylene glycol monobutyl ether were individually added dropwise over the course of about 2 hours. The reaction was carried out while nitrogen was introduced into the reactor and the solution was stirred.

One hour after the addition of the two mixtures, 2.5 parts of azobisisobutyronitrile was added to the reactor, and after another 2 hours, 2.5 parts of azobisisobutyronitrile was added to the reaction solution. The mixture was then maintained at 120° C. for 2 hours. After the end of the reaction, the unreacted monomers and ethylene glycol monobutyl ether were evaporated under reduced pressure to give a copolymer solution having a drying residue of 70.5% and a Gardner viscosity (measured as a solution of 40% solids in ethylene glycol monobutyl ether) of K. The copolymer solution was neutralized with lactic acid to 1.0 equivalent, and water was added to give an aqueous solution of a comb-shaped copolymer having a solids content of 40% [A-5].

PRODUCTION EXAMPLE 6

A copolymer solution having a drying residue of 70.4% and a Gardner viscosity (measured as a solution of 40% solids in ethylene glycol monobutyl ether) of I was obtained by operating in the same way as in Production Example 1 except that a mixture composed of 140 parts of the modified acrylic monomer (a-2), 35 parts of 1-vinyl-2-pyrrolidone, 37 parts of N,N-dimethylacrylamide and 38 parts of N,N-dimethylaminopropylacrylamide and a mixture composed of 6.5 parts of azobisdimethylvaleronitrile and 40 parts of ethylene glycol monobutyl ether were used instead of the two mixtures used in Production Example 1. The resulting copolymer solution was neutralized with lactic acid to 1.0 equivalent, and water was added to give an aqueous solution of a comb-shaped copolymer having a solids content of 40% [A-6].

PRODUCTION EXAMPLE 7

A copolymer solution having a drying residue of 70.0% and a Gardner viscosity (measured as a solution of 40% solids in ethylene glycol monobutyl ether) of J was obtained by operating in the same way as in Production Example 1 except that a mixture composed of 75 parts of the unsaturated monomer having a urethane linkage (a-3), 25 parts of 2-ethylhexyl acrylate, 35 parts of 1-vinyl-2-pyrrolidone, 50 parts of n-butyl methacrylate, 50 parts of 2-hydroxyethyl methacrylate and 15 parts of N,N-di-methylaminopropylacrylamide, and a mixture composed of 6 parts of azobisdimethylvaleronitrile and 36 parts of ethylene glycol monobutyl ether were used instead of the two mixtures used in Production Example 1. The resulting copolymer solution was neutralized with lactic acid to 1.0 equivalent, and water was added to give an aqueous solution of a comb-shaped copolymer having a solids content of 40% [A-7].

PRODUCTION EXAMPLE 8

A copolymer solution having a drying residue of 70.3% and a Gardner viscosity (measured as a solution of 40% solids in ethylene glycol monobutyl ether) of L was obtained by operating in the same way as in Production Example 1 except that a mixture composed of 107 parts of the modified acrylic monomer (a-1), 55 parts of stearyl methacrylate, 25 parts of 1-vinyl-2-pyrrolidone, 38 parts of 2-hydroxyethyl acrylate and 25 parts of N,N-dimethyl-aminoethyl methacrylate and a mixture composed of 6 parts of azobisdimethylvaleronitrile and 40 parts of ethylene glycol monobutyl ether were used instead of the two mixtures used in Production Example 1. The resulting copolymer was mixed with 14.0 parts of lactic acid, 11.3 parts of 1,2-butylene oxide and 11.3 parts of water and reacted at 90° C. for 6 hours to convert it into a quaternary ammonium salt. Water was further added to give an aqueous solution of a comb-shaped copolymer having a solids content of 40% [A-8].

[II] Production of cationic epoxy resins

PRODUCTION EXAMPLE 9

A reactor equipped with a thermometer, a stirrer, a reflux condenser and a nitrogen gas blowing port was charged, while blowing nitrogen gas, with 525 parts of propylene oxide-modified bisphenol A diglycidyl ether [GLYCI-ALE BPP-350, tradename for a product of Sanyo Chemical Industries, Ltd.; epoxy equivalent about 340] 342 parts of bisphenol A and 36 parts of a methyl isobutyl ketone solution of ketimine formed from monoethanolamine and methyl isobutyl ketone (effective components 80%), and they were reacted at 160° C. until the epoxy groups disappeared.

Furthermore, 665 parts of bisphenol diglycidyl ether having an epoxy equivalent of about 190 and 232 parts of a methyl isobutyl ketone solution of ketimine formed from monoethanolamine and methyl isobutyl ketone (effective components 80%) were added, and reacted at 140° C. until the epoxy group concentration reached 0.27 millimole/g to give a solution of an epoxy resin having a number average molecular weight of about 1500. The epoxy resin solution was then diluted and cooled with 365 parts of ethylene glycol monobutyl ether. When the solution attained a temperature of 100° C., 100 parts of a methyl isobutyl ketone solution of diketimine formed from diethylene triamine and methyl isobutyl ketone (effective components 80%) was added and reacted at 100° C. until the rise of the viscosity stopped. As a result, an epoxy-polyamine resin solution having a solids content of 81% was obtained. When the resin solution was adjusted to a solids concentration of 50% using ethylene glycol monobutyl ether, the solution had a Gardner viscosity (25° C.) of W.

PRODUCTION EXAMPLE 10

A reactor equipped with a thermometer, a stirrer, a reflux condenser and a nitrogen gas blowing port was charged, while blowing nitrogen gas, with 525 parts of butyl glycidyl ether-modified bisphenol A diglycidyl ether [XB-4122, a tradename for a product of Ciba-Geigy Ltd.], 331 parts of bisphenol A and 36 parts of a methyl isobutyl ketone solution of ketimine formed from monoethanolamine and methyl isobutyl ketone (effective components 80%), and they were reacted at 160° C. until the epoxy groups disappeared.

Furthermore, 676 parts of bisphenol A diglycidyl ether having an epoxy equivalent of about 190 and 232 parts of a methyl isobutyl ketone solution of ketimine formed from monoethanolamine and methyl isobutyl ketone (effective components 80%) were added, and reacted at 140° C. until the epoxy group concentration reached 0.28 millimole/g to give a solution of an epoxy resin having a number average molecular weight of about 1500.

The epoxy resin solution was then diluted and cooled with 365 parts of ethylene glycol monobutyl ether. When the solution attained a temperature of 100° C., 100 parts of a methyl isobutyl ketone solution of diketimine formed from diethylene triamine and methyl isobutyl ketone (effective components 80%) was added and reacted at 100° C. until the rise of the viscosity stopped. As a result, an epoxy-polyamine resin solution having a solids content of 81% was obtained. When the resin solution was adjusted to a solids concentration of 50% using ethylene glycol monobutyl ether, the solution had a Gardner viscosity (25° C.) of XY.

PRODUCTION EXAMPLE 11

A flask equipped with a stirrer, a thermometer, a nitrogen introduction tube and a reflux condenser was charged with 518 parts of an epoxy resin having a number average molecular weight of 370 and an epoxy equivalent of 185 obtained by the reaction of bisphenol A with epichlorohydrin, and 57 parts of bisphenol A and 0.2 part of dimethylbenzylamine were added. They were reacted at 120° C. until the epoxy equivalent of the product reached 250. Then, 213 parts of epsilon-caprolactone and 0.03 part of tetrabutoxytitanium were added, and the temperature was raised to 170° C. While maintaining this temperature, the product was sampled periodically, and the amount of the unreacted epsilon-caprolactone was monitored by infrared absorption spectroscopy. When the conversion reached 98% or more, 148 parts of bisphenol A and 0.4 part of dimethylbenzylamine were further added and reacted at 130° C. until the epoxy equivalent of the product reached 936. Then, 257.4 parts of methyl isobutyl ketone, 25.6 parts of diethylamine, and 68.3 parts of diethanolamine were added, and reacted at 80° C. for 2 hours. The reaction mixture was diluted with methyl ethyl ketone to give an epoxy-polyamine resin solution having a resin solids content of 72% and an amine value (resin solids) of 54.5.

PRODUCTION EXAMPLE 12

One thousand parts of bisphenol A diglycidyl ether (epoxy equivalent 910) was dissolved in 463 parts of ethylene glycol monoethyl ether at 70° C. with stirring. Furthermore, 80.3 parts of diethylamine was added, and the materials were reacted at 100° C. for 2 hours to give a solution of amine-epoxy resin adduct.

[III] Production of blocked polyisocyanates

PRODUCTION EXAMPLE 13

Production of a blocked polyisocyanate:

A reactor was charged with 222 parts of isophorone diisocyanate. While the reaction temperature was maintained at 30° to 40° C. by external cooling, 174 parts of methyl ethyl ketoxime was gradually added dropwise and reacted. The reaction mixture was diluted with 44 parts of methyl ethyl ketone to give a completely blocked polyisocyanate having a solids content of 90%.

PRODUCTION EXAMPLE 14

Production of a partially blocked polyisocyanate:

Two hundred part of hexamethylene diisocyanate was introduced into a reactor. While the reaction temperature was maintained at 30° to 40° C. by external cooling, 155 parts of methyl ethyl ketoxime was gradually added dropwise and reacted to give a partially blocked polyisocyanate.

PRODUCTION EXAMPLE 15

Production of a blocked polyisocyanate:

Dibutyltin laurate (0.05 part) was added to 875 parts of Coronate L (polyisocyanate produced by Nippon Polyurethane Industry Co., Ltd.; NCO content 13%; nonvolatile content 75%). The mixture was heated to 50° C., and 390 parts of 2-ethylhexanol was added. Then, the reaction was carried out at 120° C. for 90 minutes. The resulting product was diluted with 130 parts of ethylene glycol monoethyl ether.

PRODUCTION EXAMPLE 16

The partially blocked polyisocyanate obtained in Production Example 14 (83.7 parts) was added to 500 parts of the solution of amine-epoxy resin adduct obtained in Example 12, and they were reacted at 100° C. in a stream of nitrogen until absorption of the isocyanate groups ceased when determined by infrared absorption spectroscopy. The reaction mixture was diluted with 143.1 parts of diethylene glycol monobutyl ether to give a blocked isocyanate-added epoxy-polyamine resin solution having a solids content of 70% and an amine value (resin solids) of 44.2.

[IV] Production of a conventional pigment dispersing agent

PRODUCTION EXAMPLE 17 (for comparison)

Toluene diisocyanate (174 parts) and 727 parts of an alkylaryl polyether (TRITON X-102, a tradename for a product of Rohm & Haas Co, represented by the following formula

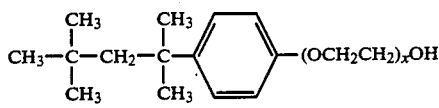

in which x is 12–13) were charged into a reactor, and reacted at 30° to 35° C. for 2 hours with stirring. Then, 89 parts of dimethylethanolamine was added, and reacted for 2 hours to give a product. Separately, 400 parts (383.8 parts as solids) of an epoxy resin (Epon 829) and 136.8 parts (solids content 136.8 parts) of bisphenol A were charged into a reactor, and heated to 155° to 160° C. and reacted at this temperature for 1 hour. To the reaction mixture were added 792 parts of the above product, 96 parts (effective component 72 parts) of lactic acid and 113.7 parts of deionized water. The mixture was maintained at 80° to 85° C. for 1 hour to give a pigment dispersing agent having a solids content of 40%.

[V] Preparation of pigment pastes

Forty parts of titanium dioxide pigment (Titan White R-600E, a tradename for a product of Teikoku Chemical Industry Co., Ltd.), 2 parts of carbon black pigment (RAVEN 1255, a tradename for a product of Columbian Chemicals Company) and 38 parts of deionized water were added to 20 parts of the comb-shaped copolymer solution [A-1] obtained in Production Example 1, and the mixture was dispersed in a ball mill for 20 hours to give a pigment paste (P-1) having a solids content of 47% and a particle diameter, measured by a grindometer, of 8 microns.

The following pigment pastes were obtained by repeating the above procedure except that the comb-shaped copolymer solutions [A-2], [A-3], [A-4], [A-5], [A-6], [A-7], [A-8] obtained in Production Examples 2 to 8 and the polymer solution obtained in Production Example 17 (comparison) were each used instead of the comb-shaped copolymer solution A-1 of Production Example 1.

Paste (P-2) from [A-2] of Production Example 2;
paste (P-3) from [A-3] of Production Example 3;
paste (P-4) from [A-4] of Production Example 4; and
Paste (P-5) from [A-5] of Production Example 5;
paste (P-6) from [A-6] of Production Example 6;
paste (P-7) from [A-7] of Production Example 7;
paste (P-8) from [A-8] of Production Example 8; and
paste (P-c) from the polymer solution obtained in Production Example 17.

[VI] Preparation of cationic electrodeposition paints

EXAMPLE 1

The cationic epoxy resin obtained in Production Example 9 (92.6 parts; solids content 75 parts) and 27.8 parts (solids content 25 parts) of the blocked polyisocyanate obtained in Production Example 13 were mixed, and 1.8 parts of 90% acetic acid was added. They were mixed in a high-speed stirrer, and neutralized. With stirring, 512.8 parts of deionized water was gradually added to prepare an aqueous dispersion. The aqueous dispersion was mixed with 100 parts (solids content 47 parts) of the pigment paste (P-1) to prepare a cationic electrodeposition paint having a solids content of 20%.

EXAMPLES 2–13 AND COMPARATIVE EXAMPLES 1–5

In each run, a cationic electrodeposition paint having a solids content of 20% was prepared in the same way as in Example 1 except that each of the recipes shown in Table 1 was used instead of the recipe used in Example 1.

[VII] Preparation of electrodeposition coated plates

Each of the electrodeposition paints prepared in Examples 1 to 13 and Comparative Examples 1 to 5 was cationically electrodeposited on a cold-rolled steel plate for 3 minutes at an applied voltage of 250 V. The plate was then washed with water, and baked at 170° C. for 30 minutes. An electrodeposition coated plate having a film thickness of about 20 microns was obtained. The electrodeposition coated plate was tested, and the results are shown in Table 2.

TABLE 1

| Run | 1 | 2 | 3 | 4 | 5 | 6 | 7 | 8 | 9 |
|---|---|---|---|---|---|---|---|---|---|
| Cationic epoxy resin Production Example No. | | | | | | | | | |
| 9 | 92.6 | 92.6 | 92.6 | 67.9 | 92.6 | 92.6 | 92.6 | 97.9 | |
| 10 | | | | | | | | | 92.6 |
| 11 | | | | | | | | | |
| 16 | | | | | | | | | |
| Aqueous solution of comb-shaped copolymer [A-1] | | | | 50 | | | | 50 | |
| Blocked isocyanate Product Example No. | | | | | | | | | |
| 13 | 27.8 | 27.8 | 27.8 | 27.8 | 27.8 | 27.8 | 27.8 | 27.8 | 27.8 |
| 15 | | | | | | | | | |
| 90% acetic acid | 1.8 | 1.8 | 1.8 | 1.8 | | | | | 1.8 |
| Deionized water | 512.8 | 512.8 | 512.8 | 487.5 | | | | | 512.8 |
| Pigment paste | | | | | | | | | |
| P-1 | 100.0 | | | | | | | | |
| P-2 | | 100.0 | | | | | | | |
| P-3 | | | 100.0 | | | | | | |
| P-4 | | | | 100.0 | | | | | |
| P-5 | | | | | 100.0 | | | | 100.0 |
| P-6 | | | | | | 100.0 | | | |

TABLE 1-continued

|  | | | | Example | | | | Comparative Example | | | |
|---|---|---|---|---|---|---|---|---|---|---|---|
| Run | 10 | 11 | 12 | 13 | 1 | 2 | 3 | 4 | 5 | | |
| P-7 | | | | | | | | | | 100.0 | |
| P-8 | | | | | | | | | | | 100.0 |
| P-c | | | | | | | | | | | |
| Cationic epoxy resin Production Example No. | | | | | | | | | | | |
| 9 | | 74.1 | 37.0 | 97.9 | 92.6 | | | 74.1 | 37.0 | | |
| 10 | | | | | | 92.6 | | | | | |
| 11 | 104.2 | | | | | | 104.2 | | | | |
| 16 | | | 92.9 | | | | | | 92.9 | | |
| Aqueous solution of comb-shaped copolymer [A-1] | | | | 50 | | | | | | | |
| Blocked isocyanate Production Example No. | | | | | | | | | | | |
| 13 | 27.8 | | 5.6 | 27.8 | 27.8 | 27.8 | 27.8 | | 5.6 | | |
| 15 | | 53.3 | | | | | | 53.3 | | | |
| 90% acetic acid | 1.8 | 1.8 | 1.8 | 1.8 | 1.8 | 1.8 | 1.8 | 1.8 | | | |
| Deionized water | 501.2 | 505.8 | 497.7 | 487.5 | 512.8 | 512.8 | | | 497.7 | | |
| Pigment paste | | | | | | | | | | | |
| P-1 | | | | | | | | | | | |
| P-2 | | | | | | | | | | | |
| P-3 | | | | | | | | | | | |
| P-4 | | | | | | | | | | | |
| P-5 | 100.0 | 100.0 | 100.0 | | | | | | | | |
| P-6 | | | | | | | | | | | |
| P-7 | | | | | | | | | | | |
| P-8 | | | | | | | | | | | |
| P-c | | | | 100.0 | 100.0 | 100.0 | 100.0 | 100.0 | 100.0 | | |

TABLE 2

| | Run | | | | | | | | | | | | | | | | |
|---|---|---|---|---|---|---|---|---|---|---|---|---|---|---|---|---|---|
| | Example | | | | | | | | | | | | | Comparative Example | | | |
| Test item | 1 | 2 | 3 | 4 | 5 | 6 | 7 | 8 | 9 | 10 | 11 | 12 | 13 | 1 | 2 | 3 | 4 | 5 |
| Two-coat weatherability (*1) | ○ | ○ | ○ | ○ | ○ | ○ | ○ | ○ | ○ | ○ | ○ | ○ | ○ | X | X | X | X | X |
| Gloss retention (%) (*2) | 97 | 98 | 97 | 99 | 98 | 98 | 97 | 99 | 98 | 99 | 97 | 92 | 91 | 75 | 77 | 81 | 75 | 76 |
| Salt spray resistance (*3) | ⊙ | ⊙ | ⊙ | ⊙ | ⊙ | ⊙ | ⊙ | ⊙ | ⊙ | ⊙ | ⊙ | ⊙ | ⊙ | ○ | ○ | ○ | ○ | ○ |
| Appearance of the electrodeposited film (*4) | △ | △ | △ | △ | ○ | ○ | ○ | ○ | ○ | ○ | ○ | ○ | ○ | ○ | ○ | ○ | ○ | ○ |

The tests indicated in Table 2 were carried out by the following methods.

(*1): Two-coat weatherability

An organic solvent-base thermosetting acrylic resin paint ("Magicron HK-1", a tradename for a product of Kansai Paint Co., Ltd.) was coated on the electrodeposited film of each of the coated plates prepared as above to a dry film thickness of about 35 microns, and then heated at 140° C. for 30 minutes to cure it. The resulting coated plate was exposed to a sunshine weather-o-meter for 300 hours, and then immersed in hot water at 40° C. for 20 hours. Then, the coated film was crosscut until the cut reached the substrate. The crosscut film was tested by abruptly peeling an adhesive cellophane tape adhering to the film. The result was evaluated in accordance with the following standards.

○ : No peeling on the electrodeposition coated surface

X : Peeling occurred on the electrodeposition coated surface (*2): Gloss retention The electrodeposition coated plate was exposed for 200 hours to a sunshine weather-o-meter (the light quantity 1100 kjoule/m²-hr), and the ratio of the gloss (60° specular reflectance) after exposure to the gloss before exposure was examined. A digital glossmeter (Model GM-26D sold by Murakami Color Technology Laboratory) was used to measure the gloss of the sample before exposure (initial gloss) and after a 200-hour exposure. The gloss retention (%) was calculated in accordance with the following equation.

$$\text{Gloss retention} = \frac{60° \text{ gloss after exposure for 200 hrs.}}{\text{Initial } 60° \text{ gloss}} \times 100$$

(*3) Salt Spray resistance

The coated plate was subjected to a salt spray test for 480 hours in accordance with JIS Z2371. Then, an adhesive cellophane tape was applied to the coated surface and abruptly peeled. The occurrence of rusting in the peeled portion and the flaking of the coated film were observed.

The results were evaluated in accordance with the following standards.

⊙ : Changes such as rusting or film flaking were not observed at all.

○ : Slight film flaking was observed.

(*4): Appearance of the electrodeposited film

The electrodeposition paints obtained in Examples 1 to 13 and Comparative Examples 1 to 5 were each stirred at 40° C. for 2 weeks in the open state to degrade them acceleratingly. Electrodeposition coated plates were obtained by repeating the procedure described in section [VII] above using the degraded electrodeposition paints. The appearances of the coated films on these coated plates were visually evaluated in accordance with the following standards.

◯ : Good

Ⓐ: Surface roughening seen slightly

The appearances of coated films obtained by using as-prepared electrodeposition paints were goods.

We claim:

1. A cationic electrodeposition coating composition comprising
   (A) a neutralization product or a quaternary ammonium salt of a comb-shaped copolymer obtained by copolymerizing (a) 3 to 90 parts by weight of an ethylenically unsaturated monomer having a hydrocarbon chain with at least 8 carbon atoms at the molecular ends, (b) 1 to 50 parts by weight of at least one cationic (meth)acrylic monomer selected from the group consisting of aminoalkyl (meth)acrylates, aminoalkyl (meth)acrylamides, (meth)acrylates containing a quaternary ammonium salt group and (meth)acrylamides containing a quaternary ammomium salt group, (c) 1 to 60 parts by weight of an 1-vinyl-2-pyrrolidone and (d) 0 to 95 parts by weight of an alpha, beta-ethylenically unsaturated monomer other than the monomers (a), (b) and (c),
   (B) a cationic epoxy resin capable of being dissolved or dispersed in water, and
   (C) a pigment.

2. The composition of claim 1 in which the monomer (a) is a monomer resulting from modification of a monomer containing an ethylenically unsaturated bond with a modifier having at least 8 carbon atoms selected from the group consisting of oils, fats, fatty acids, aliphatic alcohols, fatty acid glycidyl esters and aliphatic amines.

3. The composition of claim 2 in which the monomer containing an ethylenically unsaturated bond is an unsaturated monomer having a functional group selected from a hydroxyl group, a carboxyl group, a glycidyl group, an isocyanate group and an aziridinyl group.

4. The composition of claim 3 in which the unsaturated monomer is selected from hydroxyethyl (meth)acrylate, (meth)acrylic acid, glycidyl (meth)acrylate, a 1:1 adduct of a diisocyanate compound with a hydroxyalkyl (meth)acrylate, alpha,alpha-dimethyl-m-isopropenylbenzyl isocyanate, isocyanatoethyl (meth)acrylate and aziridinylethyl (meth)acrylate.

5. The composition of claim 2 in which the modifier is selected from lauric acid, stearic acid, oleic acid, coconut oil fatty acid, safflower oil fatty acid, lauryl alcohol, oleyl alcohol and stearyl alcohol.

6. The composition of claim 1 in which the monomer (a) is selected from alkyl esters of (meth)acrylic acid, adducts between unsaturated monomers having a glycidyl group and fatty acids, reaction products between unsaturated monomers having an isocyanate group and aliphatic alcohols, esterification products between unsaturated monomers having a hydroxyl group and fatty acids, and adducts between unsaturated monomers having an aziridinyl group and fatty acids.

7. The composition of claim 1 in which the monomer (b) is a compound selected from compounds represented by the following formulae

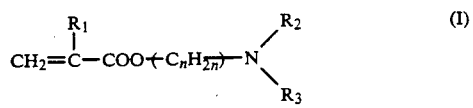

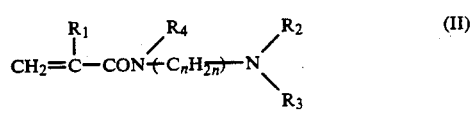

and

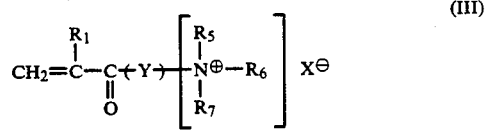

wherein $R_1$ represents a hydrogen atom or a methyl group, $R_2$, $R_3$ and $R_4$, independently from each other, represent a hydrogen atom or a lower alkyl group, n is an integer of 2 to 8, Y represents the $-O-C_gH_{2g}-$ group in which g is an integer of 2 to 8, the

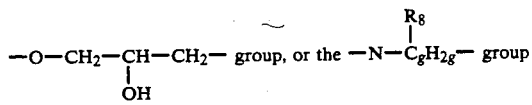

in which $R_8$ represents a hydrogen atom or a lower alklyl group, and g is as defined above, $R_5$, $R_6$ and $R_7$, independently from each other, represent a lower alkyl group, a hydroxy-lower alkyl group, a lower alkoxy-lower alkyl group, a cycloalkyl group, a substituted or unsubstituted phenyl group, or an aralkyl group, and $X^{\ominus}$ represents an anion.

8. The composition of claim 7 in which the monomer (b) is selected from N,N-dimethylaminoethyl (meth)acrylate, N,N-diethylaminoethyl (meth)acrylate and N,N-dimethylaminopropyl (meth)acrylamide.

9. The composition of claim 1 in which the monomer (d) is selected from esters of acrylic or methacrylic acid, vinyl aromatic compounds, polyene compounds, alpha, beta-ethylenically unsaturated carboxylic acids, acrylonitrile, methacrylonitrile, methyl isopropenyl ketone, vinyl acetate and vinyl propionate.

10. The composition of claim 1 in which the comb-shaped copolymer is obtained by copolymerizing 10 to 85 parts by weight of the monomer (a), 2 to 40 parts by weight of the monomer (b), 2 to 50 parts by weight of the monomer (c) and 5 to 86 parts by weight of the monomer (d).

11. The composition of claim 1 in which the acrylic monomer is used in an amount of at least 50% by weight based on the total weight of the monomers (a) to (d).

12. The composition of claim 1 in which the comb-shaped copolymer has a number average molecular weight in the range of about 700 to about 150,000.

13. The composition of claim 1 in which the comb-shaped copolymer has an amino group equivalent of at least 0.02 milliequivalent/g of copolymer.

14. The composition of claim 1 in which the cationic epoxy resin B) is selected from addition-reaction products between polyepoxide compounds and primary mono- and polyamines, secondary mono- and polyamines or primary-secondary mixed polyamines, addition-reaction products between polyepoxide compounds and secondary mono- and polyamines having a ketiminized primary amino group, and reaction products obtained by etherification between polyepoxide compounds and hydroxy compounds having a ketiminized primary amino group.

15. The composition of claim 14 in which the polyepoxide compounds are obtained by the reaction of polyphenol compounds having a number average molecular weight of 400 to 4,000 with epichlorohydrin.

16. The composition of claim 15 in which the polyepoxide compounds are selected from (1 polyepoxides obtained by reacting an adduct of 1 mole of bisphenol A and 1 to 6 moles of a 1,2-alkylene oxide having 3 to 4 carbon atoms with 2 moles of an epihalohydrin, and reacting the resulting diepoxide compound with a bisphenol, or reacting the resulting diepoxide compound with a bisphenol and a bisphenol diglycidyl ether, (2) polyepoxides obtained by reacting an adduct of 1 to 2 moles of a glycidyl ether of a monoalcohol or a phenolic compound having 1 to 10 carbon atoms and 1 mole of bisphenol A with 2 moles of an epihalohydrin, and reacting the resulting diepoxide compound with a bisphenol, or reacting the resulting diepoxide compound with a bisphenol and a bisphenol diglycidyl ether, and (3) polyepoxides obtained by addition-reacting a lactone having 5 to 8 carbon atoms such as epsilon-caprolactone with a hydroxyl-containing epoxy resin having an epoxy equivalent of 200 to 400, and further subjecting the resulting product having a ring-opened lactone in the side chain to addition-reaction with a polyphenol compound.

17. The compound of claim 1 in which the neutralization product or quaternary ammonium salt [A] of the comb-shaped copolymer is used in an amount of about 1 to 1,000 parts by weight per 100 parts by weight of the pigment [C].

18. The composition of claim 1 in which the content of the neutralized product or quaternary ammonium salt [A] of the comb-shaped copolymer is 0.01 to 50 parts by weight as resin solids per 100 parts by weight as resin solids of the neutralized product or quaternary ammonium salt [A] of the comb-shaped copolymer and the cationic epoxy resin [B] combined.

19. A cationic electrodeposition bath comprising the composition of claim 1.

20. A method of electrodeposition coating which comprises electrodepositing the coating composition of claim 1 on the surface of a substrate.

* * * * *